(12) United States Patent
Hakuba

(10) Patent No.: US 6,405,205 B1
(45) Date of Patent: Jun. 11, 2002

(54) MESSAGE DISPLAY METHOD AND SYSTEM FOR REPRODUCTION OF DML OBJECTS IN RELATIONAL DATABASES

(75) Inventor: Tomohiro Hakuba, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/517,693

(22) Filed: Mar. 2, 2000

(30) Foreign Application Priority Data

Mar. 3, 1999 (JP) ............................................ 11-056198

(51) Int. Cl.$^7$ ............................................... G06F 17/30
(52) U.S. Cl. ................................... 707/101; 707/104.1
(58) Field of Search ............................... 707/100–104.1

(56) References Cited

U.S. PATENT DOCUMENTS

| | | | | |
|---|---|---|---|---|
| 5,301,313 A | * | 4/1994 | Terada et al. | 707/4 |
| 5,455,945 A | * | 10/1995 | VanderDrift | 707/2 |
| 5,581,756 A | * | 12/1996 | Nakabayashi | 707/2 |
| 5,911,070 A | * | 6/1999 | Solton et al. | 395/701 |
| 5,926,819 A | * | 7/1999 | Doo et al. | 707/104.1 |
| 6,115,704 A | * | 9/2000 | Olson et al. | 707/3 |

FOREIGN PATENT DOCUMENTS

| | | | |
|---|---|---|---|
| JP | 01-211029 | | 8/1989 |
| JP | 06-103125 | | 4/1994 |
| JP | 07-160558 | | 6/1995 |
| JP | 08-202599 | * | 8/1996 |
| JP | 2641402 | | 5/1997 |

OTHER PUBLICATIONS

JIII Journal of Technical Disclosure No. 96–13681, No. 7–5 (507), Dec. 1996, pp. 1–2—No Translation.

* cited by examiner

Primary Examiner—Maria N. Von Buhr
(74) Attorney, Agent, or Firm—Sughrue Mion, PLLC

(57) ABSTRACT

A message display system (and method) is provided for DML object reproduction in a relational database in which DML objects for accessing tables made up with rows and columns are made from user programs in compilation and are registered in a DML object library. Herein, DML objects are produced by compilation of the user programs each containing SQL statements, so that the DML objects are registered in the DML object library. In response to a change of table definition of a designated table within the tables, the user programs are subjected to analysis to select a user program related to the designated table whose definition is changed with reference to the DML object library, so that a DML object is automatically reproduced in connection with the selected user program using the designated table. In addition, a reproduction result is displayed on a screen. If the change of the table definition designates addition of a column to the designated table, messages are displayed on the screen to inform the user of the addition of the column to the designated table as well as a host variable which is required when the selected user program refers to the column being added to the designated table. Incidentally, the host variable is selected and displayed in connection with a using language used for compilation, which is examined with reference to a directory storing DML object management information.

11 Claims, 5 Drawing Sheets

```
LINE COMMAND IMAGE
0001//VALIDATE
VALIDATE SUCCEEDED    OBJLIB: LIBRARY NAME    NAME: AP1
EXECUTE MESSAGE
     004 REPRODUCTION OF OBJECT SUCCEEDED
```

```
LINE COMMAND IMAGE
0001//VALIDATE
VALIDATE SUCCEEDED    OBJLIB: LIBRARY NAME    NAME: AP1
EXECUTE MESSAGE
     ADDITION OF COLUMN
     DEFINITION OF HOST VARIABLE
     PIC  (10)
     004 REPRODUCTION OF OBJECT SUCCEEDED
```

FIG.7

<TABLE 1>

```
COLUMN 1    INTEGER
COLUMN 2    CHARACTER(4)
COLUMN 3    DECIMAL(10)
```

FIG.8

<TABLE 1>

```
COLUMN 1    INTEGER
COLUMN 2    CHARACTER(4)
COLUMN 3    DECIMAL(10)
COLUMN 4    INTEGER    ←― ADD
```

FIG.9

| DML OBJECT AP1 |
|---|
| SELECT COLUMN 2 FROM TABLE 1<br>WHERE COLUMN 1 = 1<br><br>AREA OF OPTIMAL DATABASE<br>ACCESS MEASURE |

MESSAGE DISPLAY METHOD AND SYSTEM FOR REPRODUCTION OF DML OBJECTS IN RELATIONAL DATABASES

BACKGROUND OF THE INVENTION

1. Field of the Invention

This invention relates to message display methods and systems for reproduction of DML objects used in relational databases. In addition, this invention also relates to storage media storing programs actualizing the message display methods and systems.

This application is based on Patent Application No. Hei 11-56198 filed in Japan, the content of which is incorporated herein by reference.

2. Description of the Related Art

There are provided a variety of papers regarding techniques for relational databases and data manipulation language (i.e., DML), as follows:

Japanese Patent No. 2,641,402 (corresponding to Japanese Patent Application, First Publication No. Hei 8-202599) discloses a DML object management system, in which executable DML objects are automatically reproduced to eliminate necessity in user's correction and recompilation of DML objects in response to updating of table definitions of relational databases.

Japanese Patent Application, First Publication No. Hei 6-103125 discloses an update processing system for a database management system (DBMS), in which a processing time is reduced in a conditioned update process with respect to an index retrieval for a record location of an UPDATE statement.

Japanese Patent Application, First Publication No. Hei 7-160558 discloses a database retrieve statement creation device, in which programmers are eased in loads working on creation of source programs because work areas are provided only for columns used for application programs without making definitions to view tables.

Japanese Patent Application, First Publication No. Hei 1-211029 discloses a database manipulation language processing system, in which interfaces for database management languages commonly used for user programs are provided to enable databases to be shared and managed among distributed database management systems.

In general, relational databases consist of tables made up of rows and columns. Herein, a column corresponds to a minimum unit for data being input, and a table is a set of rows which are not sorted in order and is provided for users. In the relational database, specific parts of application programs that are created by users are used for accessing tables and are converted to DML objects that are executable forms written in a database manipulation language (or data manipulation language, i.e., DML) in compilation, so that the DML objects are stored in DML object libraries and directory files together with table definition information.

Access to the relational database is made by describing queries with a structured query language (i.e., SQL) in an application program that is written by a host language. Herein, the host language is a normal programming language such as COBOL and C. A data transfer between the host language and structured query language is performed by way of special variables of the host language (i.e., host variables).

In compilation of a user program, for example, parts of the program written in the structured query language are extracted to produce database access measures (i.e., DML objects) that are optimal measures to access the database. A DML object library is a database file that is used to store the DML objects. That is, the DML objects being produced are stored in the DML object library, and information regarding the user program is simultaneously stored in a directory file. The user program is made using SQL-DML statements, for example. If a table definition is changed, optimal database access measures are reproduced based on the SQL-DML statements that are extracted from the user program. This technique is disclosed by JIII Journal of Technical Disclosure No. 96-13681 in Japan, entitled "Automatic Reproduction Functions of DML Objects".

FIG. 10 is a flowchart showing conventional procedures for reproduction of DML objects at a table definition change mode. Those procedures are provided to cope with a column addition event or an event in which table definition is changed with respect to a column (or columns). In case of the column addition event, the present system searches through a DML object library to retrieve DML objects in step S101. In step S102, the system checks each of the DML objects being retrieved. That is, a decision is made as to whether the DML object uses the (added) column of the table whose definition is changed or not. In step S103, the system selects such DML object. In step S104, the DML object is subjected to automatic reproduction. In step S105, a reproduction result is displayed, wherein a message of "AP1 (e.g., a name of a DML object) reproduced" is displayed on a screen, for example. In this case, however, the DML objects using original columns of the table are excluded from subjects for the automatic reproduction in the column addition event in which the column is added by changing the table definition. So, they are not at all displayed on the screen.

Conventionally, if the table definition is changed with respect to the column(s) that is not used in the user program, the user is not informed of a reproduction result of the DML object(s). In addition, it takes much time and work to extract some user program(s) from hundreds of user programs in response to changes of table definitions. That is, it takes much time and work to make a search as to which of the user programs refers to the table whose definition is changed. In order to add columns to the table, it is necessary to define host variables used in SQL-DML statements. In some cases, however, it is not good in performance to define the host variables whose lengths well match with attributes. Because, the user programs have not yet used the added columns and lacked functions to check them.

SUMMARY OF THE INVENTION

It is an object of the invention to provide a message display method and a message display system, which support users to smoothly and promptly change user programs in response to addition of columns to tables in reproduction of DML objects.

It is another object of the invention to provide storage media recording programs corresponding to the message display method and system.

According to an outline of the invention, when a column is added by changing table definition so that the user program is being reproduced, the method or system clearly shows the added column for the DML object that uses the table whose definition is changed. In addition, it also shows definitions of a host variable, which is required when the user program refers to the added column.

A message display system (and method) of this invention is basically provided for DML object reproduction in a relational database in which DML objects for accessing tables made up with rows and columns are made from user programs in compilation and are registered in a DML object library. Herein, DML objects are produced by compilation of the user programs each containing SQL statements, so that the DML objects are registered in the DML object library. In response to a change of table definition of a designated table within the tables, the user programs are subjected to analysis to select a user program related to the designated table whose definition is changed with reference to the DML object library, so that a DML object is automatically reproduced in connection with the selected user program using the designated table. In addition, a reproduction result is displayed on a screen.

If the change of the table definition designates addition of a column to the designated table, messages are displayed on the screen to inform the user of the addition of the column to the designated table as well as a host variable which is required when the selected user program refers to the column being added to the designated table. Incidentally, the host variable is selected and displayed in connection with a using language used for compilation, which is examined with reference to a directory storing DML object management information. Moreover, examination is made on an attribute and a length of the column being added to the designated table as well.

Thus, it is possible to support the user to promptly and smoothly search and correct the user program in response to a change of table definition designating addition of a column to the designated table.

BRIEF DESCRIPTION OF THE DRAWINGS

These and other objects, aspects and embodiment of the present invention will be described in more detail with reference to the following drawing figures, of which:

FIG. 7 shows a table form before addition of a column to a table;

FIG. 8 shows a table form after addition of the column to the table;

FIG. 9 shows an actual example of a DML object; and

DESCRIPTION OF THE PREFERRED EMBODIMENT

This invention will be described in further detail by way of examples with reference to the accompanying drawings.

Figure 1:
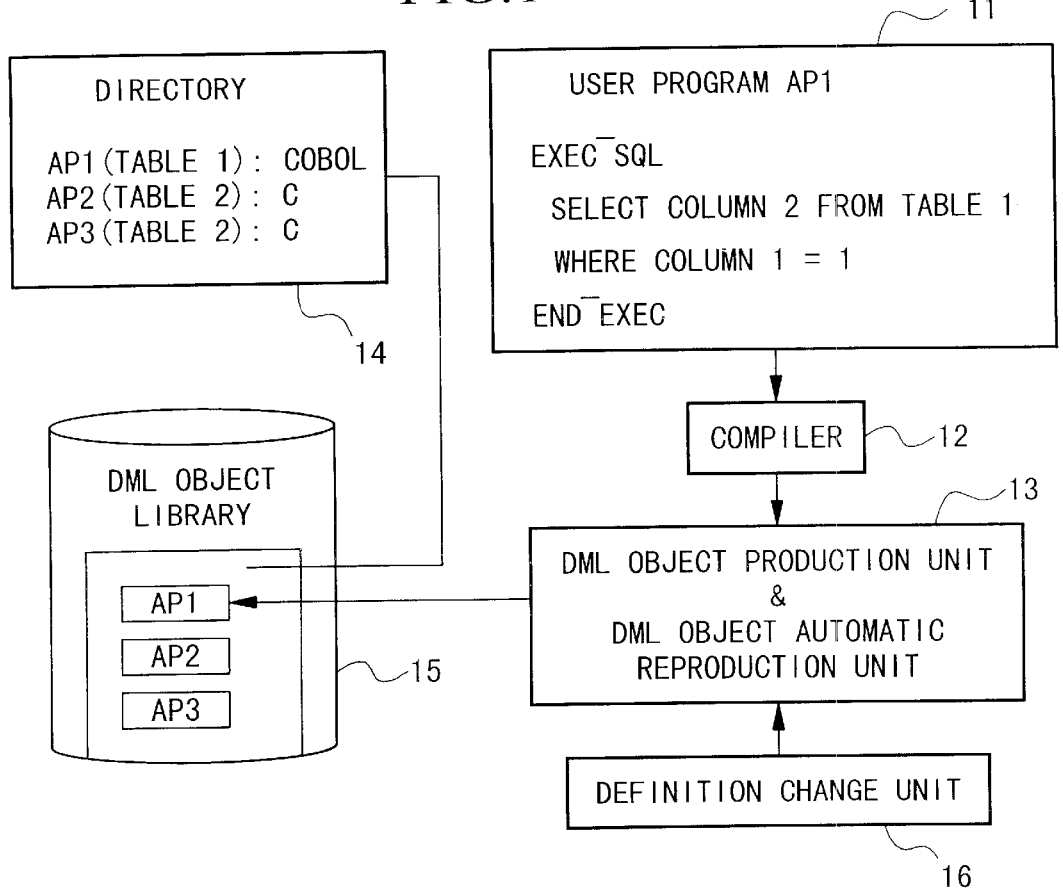
FIG. 1 is a block diagram showing a configuration of a message display system in accordance with preferred embodiment of the invention.

FIG. 1 is a block diagram showing an outline configuration of a message display system in accordance with an embodiment of the invention. Namely, the message display system is configured by a user program 11, a compiler 12, a DML object production and automatic reproduction unit 13, a directory 14, a DML object library 15 and a definition change unit 16, which are realized in response to a DML object reproduction mode. Herein, the reference numeral 13 designates a DML object production unit and a DML object automatic reproduction unit. The aforementioned elements and units are configured by programs and data, for example. Those programs are stored in memories including external memories such as hard-disk units. So, a CPU (or CPUs) read out them to run the programs according to needs so that functions of the aforementioned elements and units are to be actualized. Incidentally, the user program 11 contains built-in SQL statements. In compilation, the compiler 12 extracts the built-in SQL statements from the user program 11. By analyzing the built-in SQL statements, the DML object production and automatic reproduction unit 13 creates "optimal" access measures by which access can be made to databases in an optimal manner. In addition to creation of the optimal access measures, the DML object production and automatic reproduction unit 13 has a function to automatically reproduce DML objects in response to changes of table definitions being made by the definition change unit 16.

The directory 14 stores DML object management information, while the DML object library 15 stores the DML objects.

Figure 2:
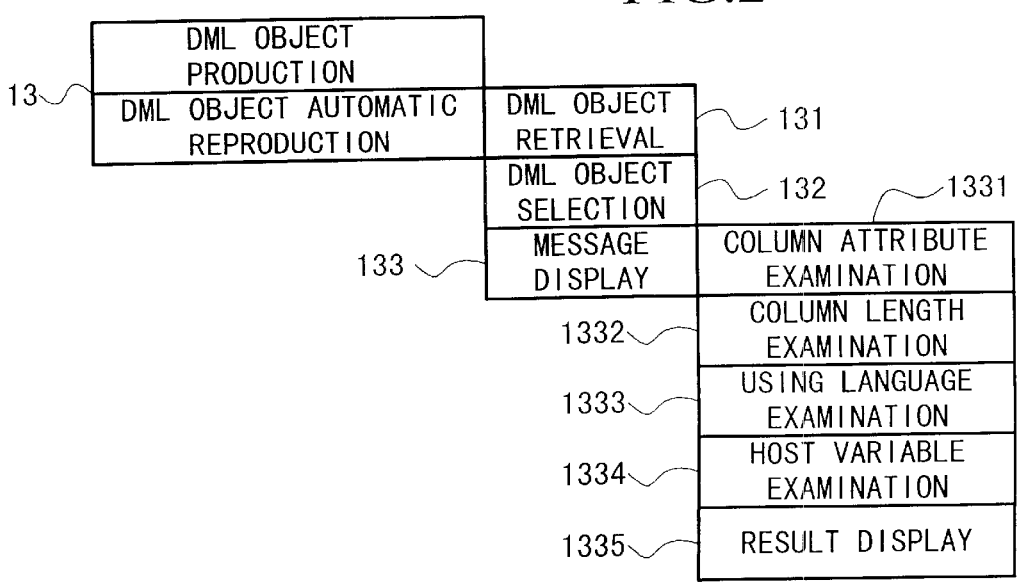
FIG. 2 is a block diagram showing details of a DML object automatic reproduction unit shown in FIG. 1.

In the present embodiment, the reference numeral 13 designates the DML object production unit and DML object automatic reproduction unit. Within those units, FIG. 2 shows details of the DML object automatic reproduction unit in a tree-structure-like manner. That is, FIG. 2 is a block diagram showing the DML object automatic reproduction unit, which is mainly configured by a DML object retrieval block 131, a DML object selection block 132 and a message display block 133. Herein, the DML object retrieval block 131 refers to the DML object library 15 which stores application programs of users. Concretely speaking, the DML object retrieval block 131 has a function to check whether a table whose definition is changed exists in SQL statements used in each of the application programs or not. In addition, the DML object selection block 132 has functions, as follows:

That is, the DML object selection block 132 selects a DML object corresponding to an index being attached. Based on the selected DML object, the DML object automatic reproduction unit reproduces an optimal database access measure. Then, the DML object selection block 132 instructs the message display block 133 to display a message corresponding to a reproduction result on a screen, for example.

The message display block 133 is configured by a column attribute examination block 1331, a column length examination block 1332, a using language examination block 1333, a host variable selection block 1334 and a result display block 1335. Herein, the column attribute examination block 1331 examines an attribute of a column being added to a table. The column length examination block 1332 examines a length of the added column by units of bytes. The using language examination block 1333 examines a language which is used in compilation with reference to the directory 14. The host variable selection block 1334 selects host variables corresponding to the using language on the basis of examination results of the column attribute examination block 1331, column length examination block 1332 and using language examination block 1333, so that the host variables are provided for display of messages. The result display block 1335 clearly shows addition of a column (or columns) with respect to the DML object using the table whose definition is changed. In addition, the result display block 1335 also displays definitions of host variables, which are required when the user program refers to the added column(s), on the screen.

Figure 3:
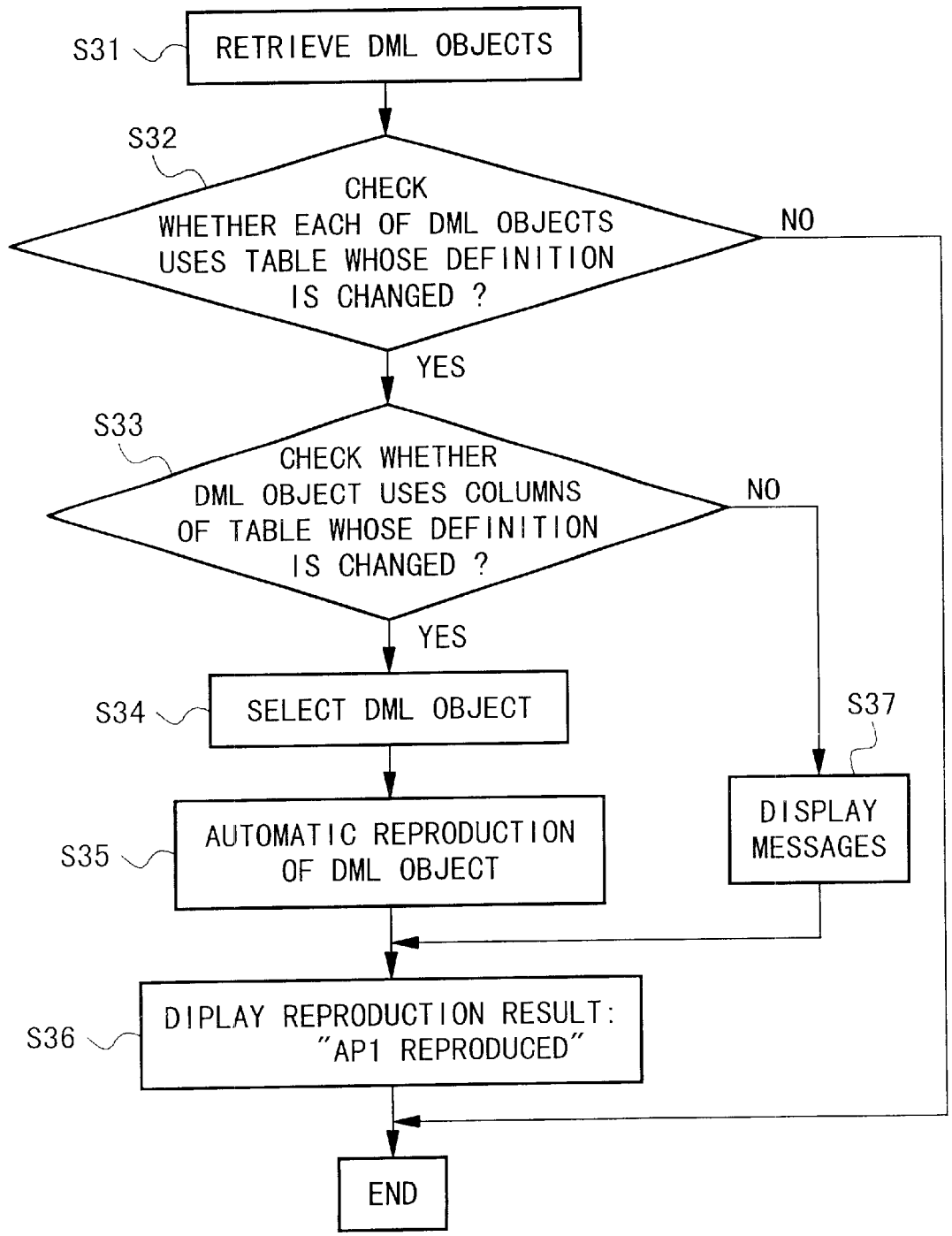
FIG. 3 is a flowchart showing procedures in operations of the DML object automatic reproduction unit in response to a change of table definition.
Figures 4, 5, 6:
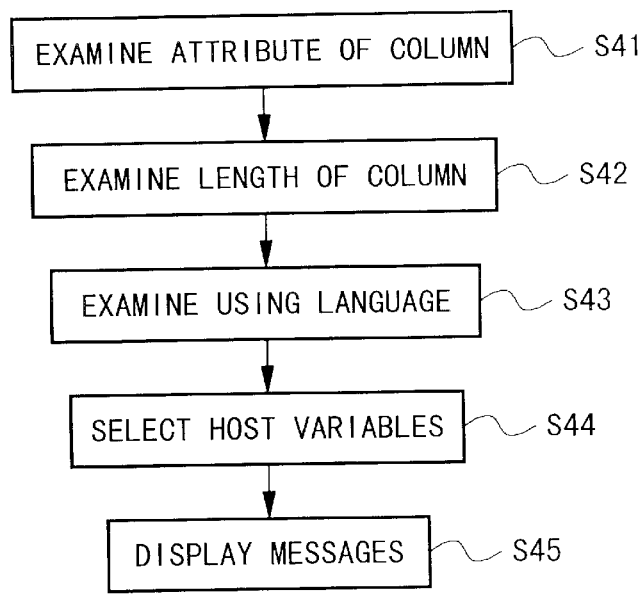
FIG. 4 is a flowchart showing procedures in operations for message display shown in FIG. 2.
FIG. 5 shows a concrete example 1 of messages being displayed on a screen.
FIG. 6 shows a concrete example 2 of messages being displayed on the screen.
Figure 10:
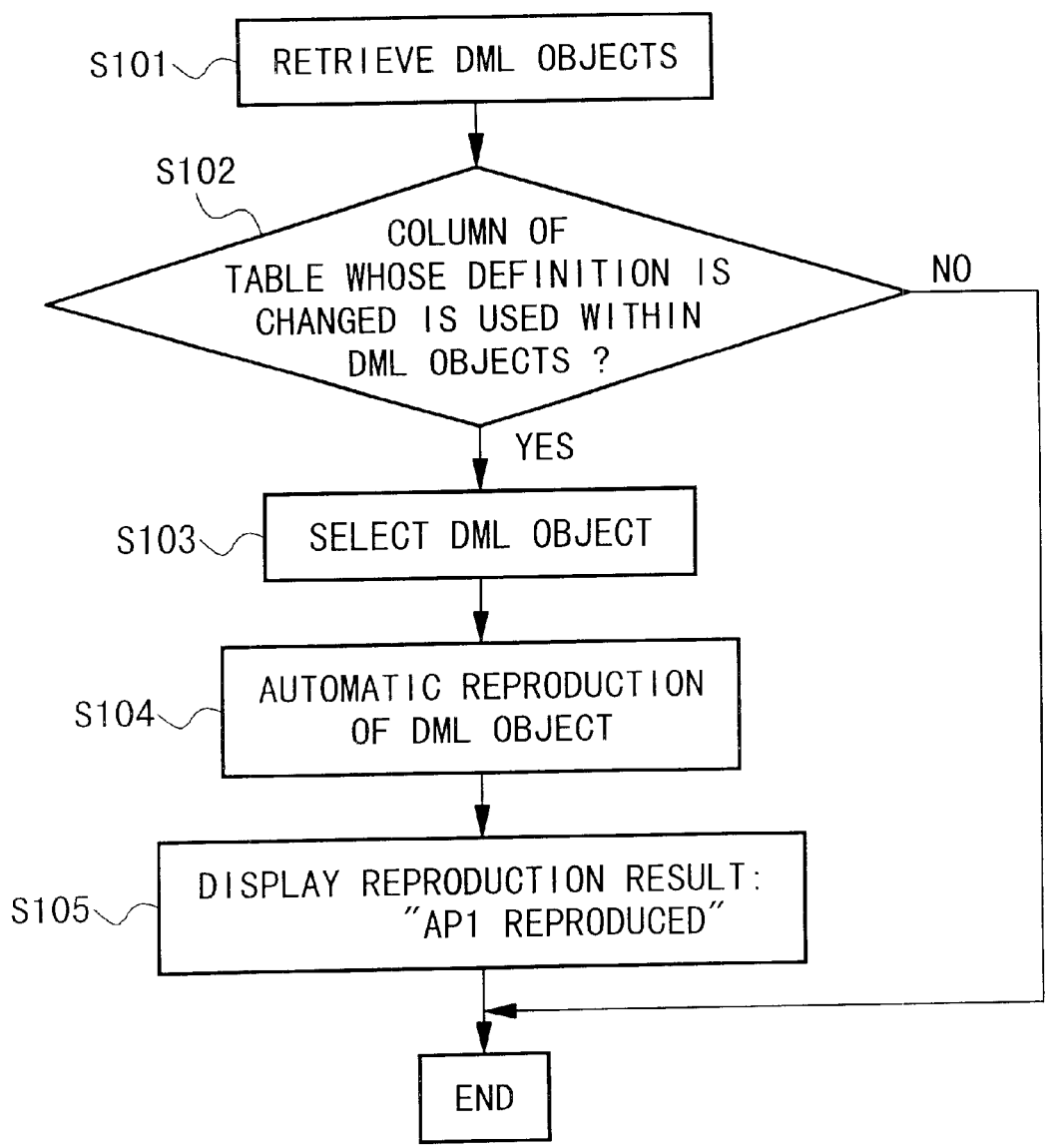
FIG. 10 is a flowchart showing conventional procedures for automatic reproduction of DML objects.

FIGS. 3 and 4 show procedures in operations of the present embodiment. Specifically, FIG. 3 is a flowchart showing operations of the DML object automatic reproduction unit (13), while FIG. 4 is a flowchart showing operations of the message display block 133. In addition, FIGS. 5 to 9 are used to explain the operations of the present embodiment. Specifically, FIG. 5 shows a concrete example 1 of messages being displayed on the screen, while FIG. 6 shows a concrete example 2 of messages being displayed on the screen. FIG. 7 shows a table form before addition of a column to a table. FIG. 8 shows a table form after addition of the column to the table. Further, FIG. 9 shows an actual example of a DML object.

Now, the operations of the present embodiment shown in FIGS. 1 and 2 will be described with reference to FIGS. 3 to 9.

Suppose that the compiler 12 compiles a user program (AP1) containing a SQL statement for retrieval of "Table 1" shown in FIG. 7, so that the DML object production unit produces a DML object which is an optimal database access measure as shown in FIG. 9. Herein, the DML object of FIG. 9 is registered in the DML object library 15 with a name of "AP1". In addition, the directory 14 also stores information regarding registration of the DML object whose name is AP1 and which is registered in the DML object library 15.

Now, a change of table definition is input by the definition change unit 16. Concretely speaking, the definition change unit 16 enters addition of a new column as "column 4", in which an attribute is INTEGER (i.e., integer type) and a length is four bytes (where INTEGER is fixed). This initiates processing of the DML object production and automatic reproduction unit 13, namely, the DML object reproduction unit and the DML object retrieval block 131 which is a part of the DML object automatic reproduction unit as shown in FIG. 2. That is, the DML object production and automatic reproduction unit 13 operates in accordance with the flowchart of FIG. 3. In step S31, the DML object retrieval block 131 searches and extracts user programs AP1, AP2 and AP3 with reference to the DML object library 15. In step S32, a check is made as to whether a table whose definition is changed exists in SQL statements used in each of the user programs or not. So, the DML object production and automatic reproduction unit 13 stops processing some user programs (i.e., AP2, AP3) in which the table whose definition is changed does not exist.

In step S33, a check is made as to whether the remaining user program (i.e., AP1) in which the table whose definition is changed exists uses existing columns of the table or not. In this case, the user program AP1 is related to the newly added column. So, the DML object production and automatic reproduction unit 13 transfers a program control to step S37, in which processing of the message display block 133 is initiated. Details of the processing of the message display block 133 will be described later in conjunction with the flowchart of FIG. 4.

Incidentally, no index is provided for the table form of FIG. 8. In case of the table being attached with an index, the DML object automatic reproduction unit initiates processing of the DML object selection block 132 in step S34. Thus, the DML object automatic reproduction unit reproduces an optimal database access measure in step S35. Then, a reproduction result is displayed on the screen in step S36. Normally, the reproduction result is displayed as shown in FIG. 5. Thereafter, the DML object automatic reproduction unit completes the processing of FIG. 3.

Next, a description will be given with respect to overall operations of the message display block 133, which is a part of the DML object automatic reproduction unit, with reference to FIG. 4.

In step S41, the message display block 133 examines an attribute of a column newly added by means of the column attribute examination block 1331. Herein, the attribute corresponds to INTEGER (i.e., integer type). In step S42, the column length examination block 1332 examines a length of the column by units of bytes. Herein, the column has a length corresponding to four bytes. In step S43, the using language examination block 1333 examines a using language used for compilation with reference to the directory 14. Herein, the using language corresponds to COBOL (i.e., Common Business-Oriented Language), for example. In step S44, the host variable examination block 1334 examines host variables that match with the COBOL on the basis of results of the foregoing steps S41 to S43. The host variables are provided for display of messages. Lastly, the message display block 133 proceeds to step S45, in which the result display block 1335 displays results on the screen as shown in FIG. 6. Herein, the result display block 1335 displays a message indicating "addition of column" as well as the host variable(s).

Incidentally, functions of blocks shown in FIGS. 1, 2 and steps shown in FIGS. 3, 4 are all actualized by the software programs. So, the CPU (not shown) reads out and runs the programs to actualize the functions of the blocks and the steps. The programs are provided from the compiler. Or, the programs are provided as being stored in storage media such as semiconductor memories, hard-disk units and CD-ROMs, independently of the compiler.

As described heretofore, the present system of this invention operates in response to a change of table definition designating addition of a column, as follows:

That is, the present system reproduces DML objects of user programs by means of the compiler. In addition, the system displays messages to inform the user of the addition of the column with respect to each DML object that uses the table whose definition is changed. Further, the system also displays the host variable that is required when the user program refers to the column added to the table.

Thus, it is possible to realize a variety of technical effects, as follows:

(1) It is possible to ease the user in loads working on search and correction of the user program related to the change of table definition designating addition of the column.

(2) It is possible to support the user to change the user program promptly and smoothly in response to an event in which the user adds a column to the table.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to be embraced by the claims.

What is claimed is:

1. A message display method applicable to a relational database in which data items are provided in a table form made up with columns and rows, so that DML objects corresponding to table-access-related parts of user programs are registered in a DML object library together with table definition information, said message display method in reproduction of the DML objects comprising the steps of:

in response to a change of table definition designating addition of a column, reproducing DML objects of the user program by means of a compiler;

making examination as to which column is being added to a table so as to display a corresponding message with respect to each of the DML objects that use the table whose definition is changed; and displaying a host variable that is required when the user program refers to the column being added to the table.

2. A message display system applicable to a relational database in which data items are provided in a table form made up with columns and rows, so that DML objects corresponding to table-access-related parts of user programs are registered in a DML object library together with table definition information, said message display system in reproduction of the DML objects comprising:

a DML object producer for producing DML objects by compiling a user program;

a definition changer for inputting information regarding a change of table definition;

a DML object reproducer for in response to the change of the table definition designating addition of a column, selecting a DML object that uses a table whose definition is changed with reference to the DML object library, and reproducing an optimal database access measure based on the selected DML object; and a message display for examining whether the DML object using the table whose definition is changed also uses the column being added to the table or not and for examining an attribute of the DML object, so that the message display displays a message regarding the addition of the column and its host variable.

3. A message display system according to claim 2 wherein the DML object reproducer comprises a DML object searcher for checking whether the table whose definition is changed exists in SQL statements used in each of the user programs registered in the DML object library or not, and a DML object selector for selecting a DML object corresponding to the table accompanied with an index so as to reproduce the optimal database access measure, so that the DML object selector instructs the message display to display a result, and wherein the message display shows which column is being added to the table with respect to the DML object that uses the table whose definition is changed, and the message display also displays definition of the host variable that is required when the user program refers to the column being added to the table.

4. A message display system according to claim 3 wherein the message display comprises a column attribute examiner for examining the attribute of the column being added to the table, a column length examiner for examining a length of the column being added to the table by units of bytes, a using language examiner for examining a using language used for compilation with reference to a directory storing information regarding the user programs, a host variable provider for providing a host variable, as a part of the message being displayed, in response to the using language on the basis of examination results of the column attribute examiner, the column length examiner and the using language examiner, and a result display for showing the column being added to the table with respect to the DML object that uses the table whose definition is changed and for showing definition of the host variable that is required when the user program refers to the column being added to the table.

5. A computer-readable media being provided for a message display system applicable to a relational database in which data items are provided in a table form made up with columns and rows, so that DML objects corresponding to table-access-related parts of user programs are registered in a DML object library together with table definition information, said computer-readable media storing programs that cause the message display system to perform a message display method in reproduction of the DML objects, comprising the steps of compiling the user programs containing SQL statements for searching tables to produce DML objects;

inputting a change of table definition designating addition of a column;

referring to the DML object library in response to the change of the table definition;

examining whether a table whose definition is changed exists in the SQL statements used in each of the user programs or not while also examining whether each of the user programs uses columns of the table or not;

selecting a DML object in connection with the table;

examining an attribute of the column being added to the table;

examining a using language used for compilation;

providing a host variable that matches with the user program based on the attribute of the column; and displaying the host variable as well as a message corresponding to information showing addition of the column with respect to the DML object that uses the table whose definition is changed.

6. A DML object reproduction system applicable to a relational database in which DML objects for accessing tables are made from user programs in compilation and are registered in a DML object library, comprising:

a DML object producer for producing DML objects by compilation of the user programs each containing SQL statements, so that the DML objects are registered in the DML object library;

a DML object reproducer for in response to a change of table definition of a designated table within the tables, analyzing each of the user programs to select a user program related to the designated table whose definition is changed with reference to the DML object library so as to automatically reproduce a DML object in connection with the selected user program using the designated table; and a display for displaying a reproduction result on a screen.

7. A DML object reproduction system according to claim 6 wherein if the change of the table definition designates addition of a column to the designated table, the display shows the addition of the column to the designated table as well as a host variable which is required when the selected user program refers to the column being added to the designated table.

8. A DML object reproduction system according to claim 7 further comprising a directory for storing DML object management information, wherein the DML object reproducer examines a using language used for compilation with reference to the directory, so that the host variable is selected and displayed in connection with the using language.

9. A DML object reproduction method applicable to a relational database in which DML objects for accessing tables are made from user programs in compilation and are registered in a DML object library, said DML object reproduction method comprising the steps of:

produced DML objects by compilation of the user programs each containing SQL statements, so that the DML objects are registered in the DML object library;

in response to a change of table definition of a designated table within the tables, analyzing each of the user programs to select a user program related to the designated table whose definition is changed with reference to the DML object library;

automatically reproducing a DML object in connection with the selected user program using the designated table; and displaying a reproduction result on a screen.

10. A DML object reproduction method according to claim 9 further comprising the steps of:

if the change of the table definition designates addition of a column to the designated table, showing the addition of the column to the designated table; and displaying a host variable which is required when the selected user program refers to the column being added to the designated table.

11. A DML object reproduction method according to claim 10 further comprising the steps of:

examining a using language used for compilation with reference to a directory which stores DML object management information; and selecting the host variable in connection with the using language.

* * * * *